United States Patent
Nam et al.

(10) Patent No.: US 12,481,427 B2
(45) Date of Patent: Nov. 25, 2025

(54) STORAGE DEVICE USING DYNAMIC JOURNALING AND OPERATION METHOD THEREOF

(71) Applicant: SAMSUNG ELECTRONICS CO., LTD., Suwon-si (KR)

(72) Inventors: Kihwan Nam, Suwon-si (KR); Dongeun Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/741,303

(22) Filed: Jun. 12, 2024

(65) Prior Publication Data

US 2025/0199689 A1   Jun. 19, 2025

(30) Foreign Application Priority Data

Dec. 19, 2023 (KR) .................. 10-2023-0185922

(51) Int. Cl.
G06F 3/06 (2006.01)

(52) U.S. Cl.
CPC .......... G06F 3/0613 (2013.01); G06F 3/0656 (2013.01); G06F 3/0659 (2013.01); G06F 3/0679 (2013.01)

(58) Field of Classification Search
CPC .... G06F 3/0613; G06F 3/0656; G06F 3/0659; G06F 3/0679; G06F 3/0604; G06F 3/0614; G06F 3/0658; G06F 2212/1016; G06F 2212/1032
USPC ........................................................ 711/103
See application file for complete search history.

(56) References Cited

U.S. PATENT DOCUMENTS

| | | | |
|---|---|---|---|
| 9,927,985 B2 | 3/2018 | Zhang et al. | |
| 10,275,351 B2 | 4/2019 | Long et al. | |
| 10,936,247 B2 | 3/2021 | Kang | |
| 10,997,065 B2 | 5/2021 | Ha et al. | |
| 11,182,245 B2 | 11/2021 | Kim et al. | |
| 11,301,369 B2 * | 4/2022 | Gholamipour | G06F 12/0246 |
| 2016/0154594 A1 | 6/2016 | Kang | |
| 2020/0218619 A1 * | 7/2020 | Hwang | G06F 12/0868 |
| 2024/0256177 A1 * | 8/2024 | Cho | G06F 3/0679 |

* cited by examiner

*Primary Examiner* — Hashem Farrokh
(74) *Attorney, Agent, or Firm* — Sughrue Mion, PLLC

(57) ABSTRACT

A method of operating a storage device is provided. The method includes updating metadata to a metadata buffer; writing journal data corresponding to the metadata into a journal buffer; determining a composition ratio between the journal data and the metadata, based on a number of valid journals involved in a replay of the metadata among the journal data; composing a meta write data in a meta write buffer, the meta write data including the metadata from the metadata buffer and the journal data from the journal buffer according to the determined composition ratio; and programming the meta write data composed in the meta write buffer into a non-volatile memory device.

20 Claims, 9 Drawing Sheets

STORAGE DEVICE USING DYNAMIC JOURNALING AND OPERATION METHOD THEREOF

CROSS-REFERENCE TO RELATED APPLICATION

This application claims priority under 35 U.S.C. § 119 to Korean Patent Application No. 10-2023-0185922 filed on Dec. 19, 2023, in the Korean Intellectual Property Office, the disclosure of which is herein incorporated by reference in its entirety.

BACKGROUND

One or more example embodiments of the disclosure described herein relate to a storage device, and more specifically, to a storage device using a dynamic journaling technique and a method of operating the same.

The time taken from booting to reach a state where input/output I/O can be processed is called initialization time or open time in a solid state drive (SSD). What takes up most of a total initialization time is the time it takes for a storage controller to read metadata from a NAND flash memory and load the metadata to a dynamic random access memory (DRAM). In particular, when using a journaling technique, metadata loaded into a DRAM must be updated again using a journal log. This procedure is called a journal replay. The journal replay process takes the longest time among initialization processes of a solid state drive (SSD).

In general, in a solid state drive (SSD), metadata is written to a NAND flash memory assuming the worst-case scenario where there is the most journal data (or journal logs) to be updated during initialization. In other words, a metadata write operation is performed under the condition that a ratio of the journal log to the metadata is fixed at a constant level. However, a method of writing journal logs and metadata at a fixed rate is a limiting factor in improving the input/output performance of the solid state drive.

SUMMARY

One or more example embodiments of the disclosure provide a storage device that may perform metadata writing by dynamically adjusting a ratio of journal logs and metadata according to a number of valid journal logs, and a method of operating the same.

According to an aspect of an example embodiment of the disclosure, provided is a method of operating a storage device, including: updating metadata to a metadata buffer; writing journal data corresponding to the metadata into a journal buffer; determining a composition ratio between the journal data and the metadata, based on a number of valid journals involved in a replay of the metadata among the journal data; composing a meta write data in a meta write buffer, the meta write data including the metadata from the metadata buffer and the journal data from the journal buffer according to the determined composition ratio; and programming the meta write data composed in the meta write buffer into a non-volatile memory device.

According to an aspect of an example embodiment of the disclosure, provided is a storage device, including: a non-volatile memory device including a meta area and a user area; a buffer memory including a metadata buffer in which metadata is updated, a journal buffer in which journal data is stored, and a meta write buffer in which meta write data to be programmed in the meta area is composed; and a storage controller configured to update the metadata in the metadata buffer and the journal data in the journal buffer, and based on the journal buffer being in a full state, determine a composition ratio between the journal data and the metadata in the meta write buffer based on a number of valid journals involved in a replay of the metadata among the journal data.

According to an aspect of an example embodiment of the disclosure, provided is a method of operating a storage device that manages metadata according to a journaling technique, the method including: writing journal data into a journal buffer; determining a number of valid journals involved in a replay of metadata among the journal data written in the journal buffer; and determining a composition ratio of a meta write buffer according to the determined number of valid journals.

BRIEF DESCRIPTION OF DRAWINGS

The above and other objects and features of the disclosure will become apparent by describing in detail certain example embodiments thereof with reference to the accompanying drawings.

DETAILED DESCRIPTION

It is to be understood that both the foregoing general description and the following detailed description are provided for illustrative purposes only. Reference signs are indicated in detail in embodiments of the disclosure, examples of which are indicated in the reference drawings. Wherever possible, the same reference numbers are used in the description and drawings to refer to the same or like parts.

Figure 1:
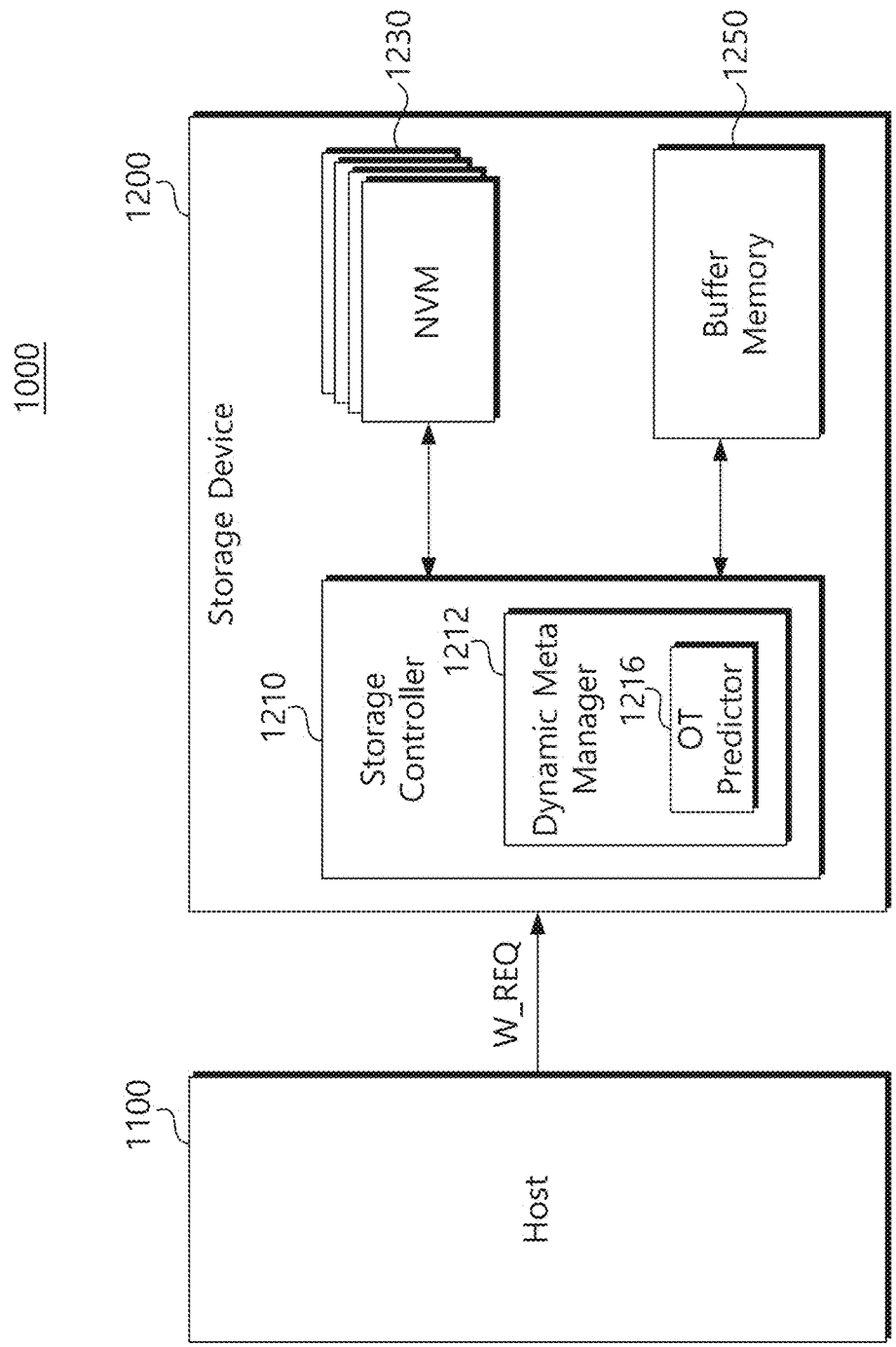
FIG. 1 is a block diagram showing a storage system including a storage device according to one or more example embodiments of the disclosure.

FIG. 1 is a block diagram showing a storage system including a storage device according to one or more example embodiments of the disclosure. The storage system 1000 may include a host 1100 and a storage device 1200. The storage device 1200 may include a storage controller 1210, a non-volatile memory device 1230, and a buffer memory 1250.

The host 1100 may manage and process overall operations of the storage system 1000. The host 1100 may transmit a read request and/or write request W_REQ to the storage device 1200. The host 1100 may perform various arithmetic and/or logical operations to access the storage device 1200. For example, the host 1100 may include one or more processor cores. The host 1100 may be implemented using a dedicated circuit such as field programmable gate arrays (FPGA) or an application specific integrated circuit (ASIC), or may be implemented as a system on chip (SoC). The host 1100 may include at least one of a general-purpose processor, a dedicated processor, and an application processor. The host 1100 may be the processor itself or an electronic device or system including the processor.

The storage device 1200 may include a storage controller 1210, a non-volatile memory device 1230, and a buffer memory 1250. The storage controller 1210 may program data in the non-volatile memory device 1230 according to the write request W_REQ from the host 1100. Additionally or alternatively, the storage controller 1210 may read data stored in the non-volatile memory device 1230 according to a read request from the host 1100. For these features, the storage controller 1210 may use a mapping table that defines a correspondence between a logical address and a physical address of data stored (or to be stored) in the non-volatile memory device 1230. The mapping table may be mainly stored and managed in the buffer memory 1250, which may be provided as a dynamic random access memory (DRAM).

The storage controller 1210 may control the non-volatile memory device 1230 and the buffer memory 1250. For example, the storage controller 1210 may write the requested data to the non-volatile memory device 1230 in response to the write request W_REQ received from the host 1100. For example, the storage controller 1210 may provide an address ADDR, a command CMD, and a control signal to the non-volatile memory device 1230 to perform write, read, and/or erase operations of the non-volatile memory device 1230.

The storage controller 1210 may process metadata generated for a memory management operation(s) according to a journaling technique. That is, the storage controller 1210 may accumulate metadata and store information about a part to be changed in the accumulated metadata as a journal log or journal data. The storage controller 1210 may compose a meta write buffer using the journal data and metadata at a specific point in time, and program data of the meta write buffer in the non-volatile memory device 1230 in a unit of the meta write buffer. A ratio between journal data and metadata composing the meta write buffer may be flexibly adjusted. This technique will be referred to as dynamic journaling. By managing metadata by applying dynamic journaling, a number of performing metadata write operations may be reduced, thereby improving input/output performance of the storage device 1200.

Here, metadata refers to data for managing user data and/or data generated by the storage system 1000 to manage the non-volatile memory device 1230. For example, metadata may include at least one of mapping information used to convert a logical address into a physical address in the non-volatile memory device 1230, a physical block information indicating data on a memory page included in physical blocks of the non-volatile memory device 1230, and trim data information indicating data deleted from the host 1100, and other various information for managing the memory space of the non-volatile memory device 1230.

In addition, journal data may represent data including log information corresponding to changes in user data and/or metadata. For this purpose, journal data may include a plurality of log entry information. For example, journal data may include information about a change point (or check point) in user data and/or metadata. In some embodiments, log entry information may include information about a type indicating an operation in which a metadata change occurred and data needed for restoring (or recovering) the metadata change. Information about the type representing the operation in which metadata change occurred may include information defining types of all operations that may change metadata, such as a write operation, a block allocation operation, and a page copy operation. Information about data for recovering the metadata change may include a logical address, an old physical address, and a new physical address.

To apply the above-described dynamic journaling, the storage controller 1210 according to one or more example embodiments of the disclosure may include a dynamic meta manager 1212. The dynamic meta manager 1212 may determine the ratio of journal data and metadata by using an open time predictor 1216. The dynamic meta manager 1212 may use a dynamic journaling technique to compose a meta write buffer while flexibly changing the ratio or size of journal data and metadata at runtime. In other words, when composing the meta write buffer, the dynamic meta manager 1212 may adjust the ratio of journal data and metadata to a range that may satisfy an open time.

Here, the open time refers to a time period from when power is applied during booting or initialization of the storage device 1200 to a time of reaching a state capable of processing an input and/or output function. is the open time may also be called an initialization time. What accounts for most of the open time is a time taken to read metadata from the non-volatile memory device 1230 and move the read metadata to the buffer memory 1250 (or volatile memory). In particular, when using the journaling technique, a time required for a replay takes up a large portion of the open time. The replay refers to a function or an operation that re-updates metadata, loaded (or updated) into the buffer memory 1250, using the journal log.

The open time predictor 1216 may determine whether a status of journal data and metadata may meet the open time upon initialization of the storage device 1200. Here, meeting the open time may mean that the open time may not be affected or delayed. The open time predictor 1216 may use a valid journal table to manage, whenever a journal log is added, which metadata a journal was added to. The valid journal table may be used to monitor and manage a number of journal logs that require a replay during initialization for each meta area. Additionally, the open time predictor 1216 may refer to the valid journal table during a meta write operation to select and provide a composition ratio of journal data and metadata in the meta write buffer. These features will be explained in more detail later with reference to the drawings.

The non-volatile memory device 1230 may store data received from the storage controller 1210 and/or transmit the stored data to the storage controller 1210 under the control of the storage controller 1210. The non-volatile memory device 1230 may include a plurality of chips or dies implemented as a NAND-type flash memory. Each chip may include a plurality of memory blocks. In the non-volatile memory device 1230, only one memory block may be selected from one chip during a write operation. Therefore, selecting one chip during a write operation may be used in the same sense as selecting one memory block. In an embodiment, each of the plurality of memory blocks may have a three-dimensional memory structure in which word line layers are stacked in a vertical direction on a substrate. Each of the memory blocks may be managed by the storage controller 1210 through information for wear leveling, such as an erase count.

The buffer memory 1250 may provide a buffer function and/or a metadata storage function of the storage device 1200. Additionally, the buffer memory 1250 may support a direct memory access (DMA) function of data exchanged between the non-volatile memory device 1230 and the host 1100. In other words, the buffer memory 1250 may provide a buffer function to temporarily store data programmed in the non-volatile memory device 1230 and/or data output from the non-volatile memory device 1230. In particular, the buffer memory 1250 may store various metadata such as a mapping table generated by the storage controller 1210. The buffer memory 1250 of the disclosure may include a metadata buffer configured to store metadata, a journal buffer configured to store journal data, and a meta write buffer configured to store journal data and metadata to be programmed in the non-volatile memory device 1230.

According to the above-described configuration, the storage device 1200 of one or more example embodiments of the disclosure may manage metadata according to a dynamic journaling technique. That is, when composing the meta write buffer, the storage controller 1210 may vary the ratio of journal data and metadata within a range that may satisfy the open time. Accordingly, a number of times metadata is written to the non-volatile memory device 1230 may be reduced, and the input/output performance of the storage device 1200 may be improved. In addition, as a number of writing operations to the metadata area of the non-volatile memory device 1230 decreases, a lifespan of the storage device 1200 may be extended.

Figure 2:
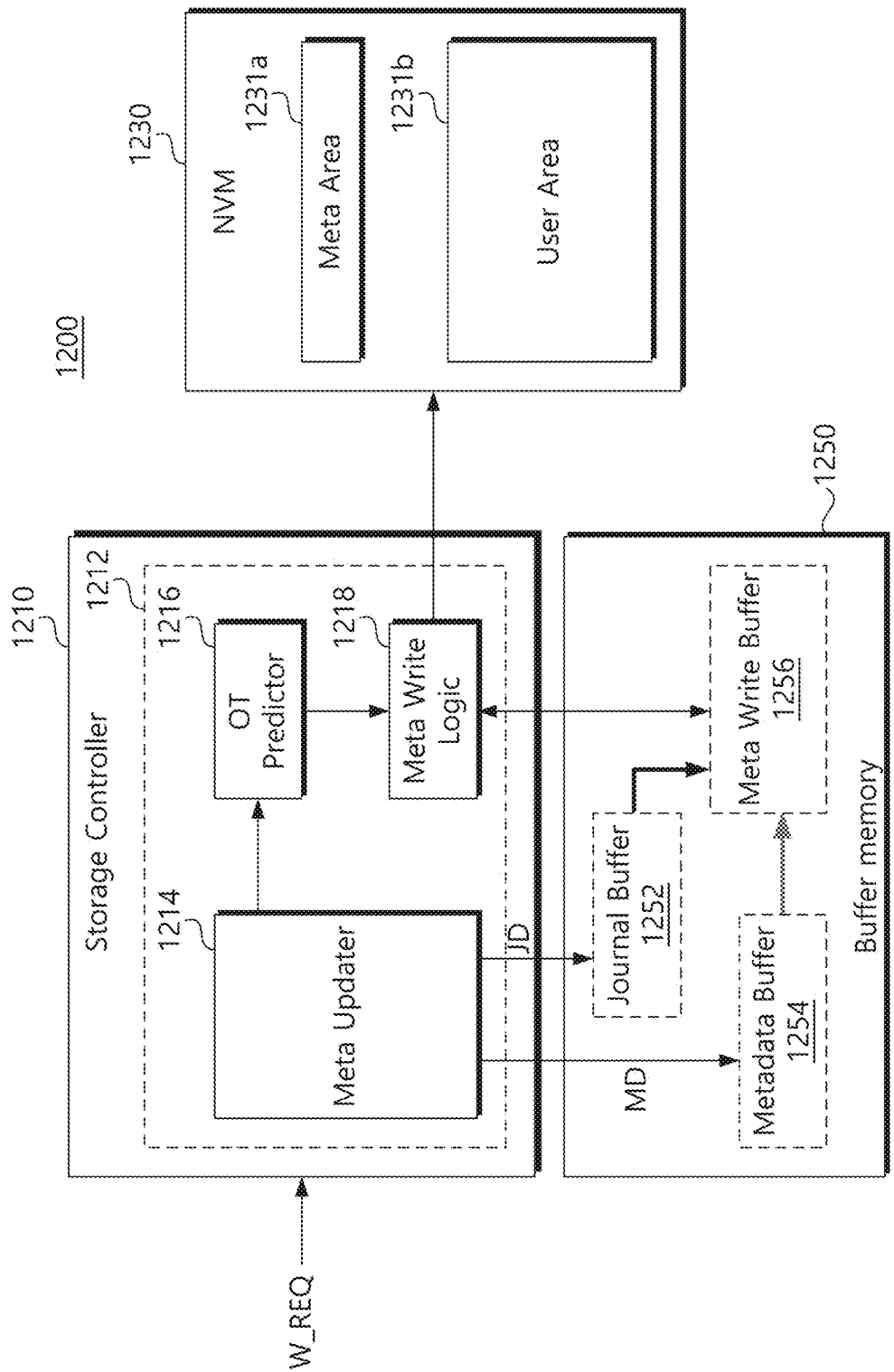
FIG. 2 is a block diagram showing an example of a configuration of the storage device of FIG. 1.

FIG. 2 is a block diagram showing an example of a configuration of the storage device of FIG. 1. Referring to FIG. 2, the storage device 1200 may include a storage controller 1210, a non-volatile memory device 1230, and a buffer memory 1250. By way of example, the storage controller 1210, the non-volatile memory device 1230, and the buffer memory 1250 may each be provided as one chip, one package, or one module. Alternatively, the storage controller 1210, the non-volatile memory device 1230, and the buffer memory 1250 may be included in one chip, one package, or one module. In other words, the storage controller 1210, the non-volatile memory device 1230, and the buffer memory 1250 may include a storage device such as an embedded memory, a memory card, a memory stick, and a solid state drive (SSD).

The storage controller 1210 may be configured to control the non-volatile memory device 1230 and the buffer memory 1250. For example, the storage controller 1210 may write data to the non-volatile memory device 1230 and/or read data stored in the non-volatile memory device 1230 at the request of the host 1100 (see FIG. 1). To access the non-volatile memory device 1230, the storage controller 1210 may receive an I/O request such as a read command or a write command. The I/O request from the host 1100 may include a logical address (e.g., logical block address (LBA) or logical page number (LPN)).

In particular, the storage controller 1210 may write the requested data to a user area 1231*b* of the non-volatile memory device 1230 in response to the write request W_REQ from the host 1100. The storage controller 1210 may generate metadata to execute the write request W_REQ and/or perform various memory management operations. Additionally, the storage controller 1210 may manage metadata by applying a journaling technique to compose a meta write buffer 1256 by adding a journal log during a metadata write operation. When composing a meta write buffer, the storage controller 1210 of the disclosure may use a dynamic journaling technique to vary the ratio of journal data and metadata in a range that may meet open time.

To manage metadata according to the dynamic journaling technique, the storage controller 1210 may include a dynamic meta manager 1212. The dynamic meta manager 1212 may include a meta updater 1214, an open time predictor 1216, and a meta write logic 1218.

The meta updater 1214 may manage metadata MD and/or journal data JD. For example, the meta updater 1214 may accumulate metadata MD in a metadata buffer 1254 and journal data JD in a journal buffer 1252. Additionally, the meta updater 1214 may perform initialization based on metadata MD read from the non-volatile memory device 1230 when the storage device 1200 is reset or powered on.

The meta updater 1214 may be implemented in various forms within the storage controller 1210. According to an embodiment, the meta updater 1214 may be implemented in hardware or software. For example, when the meta updater 1214 is implemented in the form of hardware, the meta updater 1214 may include circuits for managing metadata MD and/or journal data JD. Additionally, for example, if the meta updater 1214 is implemented in the form of software, a program (or instructions) stored in the storage controller 1210 may be executed by a processor (not shown) to perform data management operations. However, it is not limited to the above embodiments, and the meta updater 1214 may be implemented in a form that combines software and hardware, such as firmware. In one embodiment, all or part of the meta updater 1214 may be included in the flash translation layer (FTL).

The open time predictor 1216 may manage a valid journal table that includes an amount of valid journals for each metadata unit updated by the meta updater 1214. A valid journal refers to journal data that actually requires a replay of metadata. In other words, among journal logs generated for each metadata unit, there may be journal data in which no replay of metadata occurs. That is, there may be an additional updated journal log with respect to a journal log generated first and written to the journal buffer 1252. In this case, the journal log generated first becomes an invalid journal and the journal log generated later and actually involved in a replay may be considered a valid journal.

The open time predictor 1216 may determine the composition ratio of the meta write buffer 1256 based on a number of valid journals corresponding to each metadata unit. The open time predictor 1216 may determine, using the valid journal table, the composition ratio of the journal data JD and metadata MD of the meta write buffer 1256 based on the number or amount of valid journals that may affect the open time of the storage device 1200. For example, when the number of valid journals for each metadata unit to be written is less than a reference value, the ratio of journal data in the meta write buffer 1256 may be increased. Even if the ratio of journal data in the meta write buffer 1256 increases, it would not cause any problem as long as the number of valid journals that may affect the open time is at a level to meet permitted open time conditions. Conversely, when the number of valid journals becomes relatively larger than the reference value, the open time predictor 1216 may maintain the ratio of journal data JD in the meta write buffer 1256 to an existing ratio or decrease the ratio of journal data in the meta write buffer 1256.

The meta write logic 1218 may program data of the meta write buffer 1256, composed by the open time predictor 1216, into a meta area 1231*a* of the non-volatile memory device 1230. In particular, based on the journal buffer 1252 being in a full state, the meta write logic 1218 may receive the composition ratio of the journal data and metadata of the meta write buffer 1256 calculated based on the number of valid journals from the open time predictor 1216. When the meta write buffer 1256 needs to be programmed into the non-volatile memory device 1230, the meta write logic 1218 may program data from the meta write buffer 1256 at a determined write ratio to the meta area 1231*a* of the non-volatile memory device 1230.

The non-volatile memory device 1230 may include the meta area 1231*a* where metadata and journal data are stored and the user area 1231*b* where user data is stored. User data requested to be written by the storage controller 1210 may be stored in the user area 1231*b*. On the other hand, metadata and journal data whose composition ratio is dynamically adjusted in the meta write buffer 1256 may be programmed in stripe units in the meta area 1231*a*.

Data requested to be written may be temporarily stored in the buffer memory 1250. Data read from the non-volatile memory device 1230 and transmitted to the host 1100 may be temporarily stored in the buffer memory 1250. In particular, the buffer memory 1250 may include the journal buffer 1252 and the metadata buffer 1254 managed by the meta updater 1212. Additionally, the meta write buffer 1256 managed by the meta write logic 1218 may be composed in the buffer memory 1250.

Journal data corresponding to changes or update information to metadata may be recorded in the journal buffer 1252 in real time. Metadata generated through a memory management operation may be stored in the metadata buffer 1254. The meta write buffer 1256 may be composed with dynamically ratio-adjusted metadata and journal data that are programmed into the non-volatile memory device 1230. Although it has been described that the journal buffer 1252, metadata buffer 1254, and meta write buffer 1256 are included in the buffer memory 1250, the disclosure is not limited thereto. It will be understood that these buffers may be configured in an internal memory or a cache memory of the storage controller 1210. In addition, a mapping table for mapping logical addresses and physical addresses of data requested to be written may be stored and managed in the buffer memory 1250. The buffer memory 1250 may include, for example, a synchronous dynamic random access memory (DRAM).

According to the storage device 1200 described above, the composition ratio of the meta write buffer 1256 may be varied according to the number of valid journals, such that the number of times metadata is written to the non-volatile memory device 1230 may be substantially reduced. Therefore, when using the dynamic journaling technique of the disclosure, performance of the storage device 1200 may be improved. In addition, it is possible to extend the lifespan of the non-volatile memory device 1230 as the number of metadata writing operations decreases.

Figure 3:
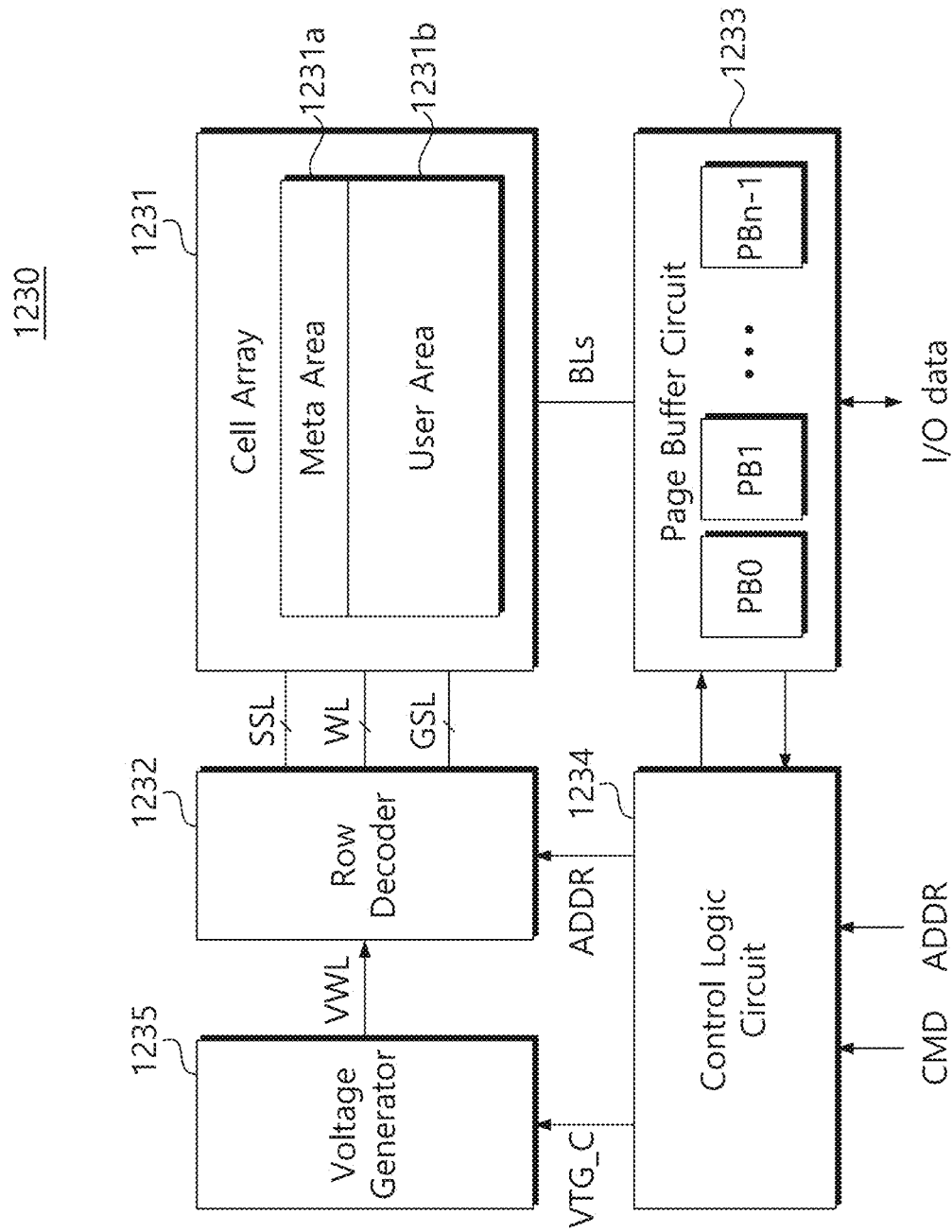
FIG. 3 is a block diagram showing an example of a configuration of a non-volatile memory device shown in FIG. 2.

FIG. 3 is a block diagram showing an example of a configuration of a non-volatile memory device shown in FIG. 2. Referring to FIG. 3, a configuration of a non-volatile memory device 1230 implemented as a flash memory device is shown. The non-volatile memory device 1230 may include a cell array 1231, a row decoder 1232, a page buffer circuit 1233, a control logic circuit 1234, and a voltage generator 1235. Although not shown in FIG. 3, the non-volatile memory device 1230 may further include a data input/output circuit and/or an input/output interface. Additionally, the non-volatile memory device 1230 may further include components such as a column logic, a pre-decoder, a temperature sensor, a command decoder, and an address decoder.

The cell array 1231 may include a plurality of memory blocks. Each of the plurality of memory blocks may include a plurality of memory cells. A plurality of memory blocks may be included in one memory plane, but the disclosure is not limited thereto. The cell array 1231 may be connected to the page buffer circuit 1233 through bit lines BLs, may be connected to row decoder 1232 through a word line WL, a string select line SSL, and a ground select line GSL. In an example embodiment, the cell array 1231 may include a three-dimensional memory cell array. The cell array 1231 may include a meta area 1231*a* where metadata and journal data are stored and a user area 1231*b* where user data is stored. User data requested to be written by the storage controller 1210 may be stored in the user area 1231*b*. On the other hand, metadata and journal data whose composition ratio is dynamically adjusted in the meta write buffer 1256 may be programmed in stripe units in the meta area 1231*a*.

The row decoder 1232 may select one of the memory blocks of the cell array 1231 in response to an address ADDR. The row decoder 1232 may select one of a word line of the selected memory block in response to the address ADDR. The row decoder 1232 may deliver a voltage VWL corresponding to an operation mode to the word line of the selected memory block. During a program operation, the row decoder 1232 may transmit a program voltage and a verification voltage to the selected word line and a pass voltage to an unselected word line. During a read operation, the row decoder 1232 may deliver a read voltage to the selected word line and a read pass voltage to the unselected word line.

The page buffer circuit 1233 may include a plurality of page buffers PB0 to PBn−1. The plurality of page buffers PB0 to PBn−1 may be respectively connected to memory cells through a plurality of bit lines BLs. The page buffer circuit 1233 may select at least one bit line among the plurality of bit lines BLs in response to a column address. The page buffer circuit 1233 may operate as a write driver or a sense amplifier depending on the operation mode. For example, during a program operation, the page buffer circuit 1233 may apply a bit line voltage corresponding to data to be programmed to the selected bit line. During a read operation, the page buffer circuit 1233 may detect data stored in a memory cell by detecting a current or a voltage of the selected bit line.

The control logic circuit 1234 may generally control various operations within the non-volatile memory device 1230. The control logic circuit 1234 may program data in the cell array 1231 or reads data from the cell array 1231 in response to a control signal CTRL, a command CMD, and/or an address ADDR. Alternatively, the control logic circuit 1234 may generate various control signals for erasing data stored in the cell array 1231. For example, the control logic circuit 1234 may output a voltage control signal VTG_C, an address ADDR, etc. In an example embodiment, the control logic circuit 1234 may output control signals for programming multi-bit data according to the received control signal CTRL, command CMD, and/or address ADDR.

The voltage generator 1235 may generate various types of voltages to perform program, read, and/or erase operations based on the voltage control signal VTG_C. For example, the voltage generator 1235 may generate a program voltage, a read voltage, and/or a program verification voltage as the word line voltage VWL. For example, the program voltage may be generated using an Incremental Step Pulse Program (ISPP) method.

The cell array 1231 of the non-volatile memory device 1230 may be managed with a limited number of write operations. Accordingly, when a number of write operations increases, the lifespan of the non-volatile memory device 1230 decreases. In particular, metadata that occurs during a memory management operation may be frequently updated. When using the dynamic journaling technique according to one or more example embodiments of the disclosure, the number of times metadata is written to the non-volatile memory device 1230 may be reduced, and thus a lifespan of the meta area 1231a may be extended. Accordingly, it is possible to extend the lifespan of the non-volatile memory device 1230 and also extend a lifespan of the storage device 1200 including the non-volatile memory device 1230.

Figure 4:
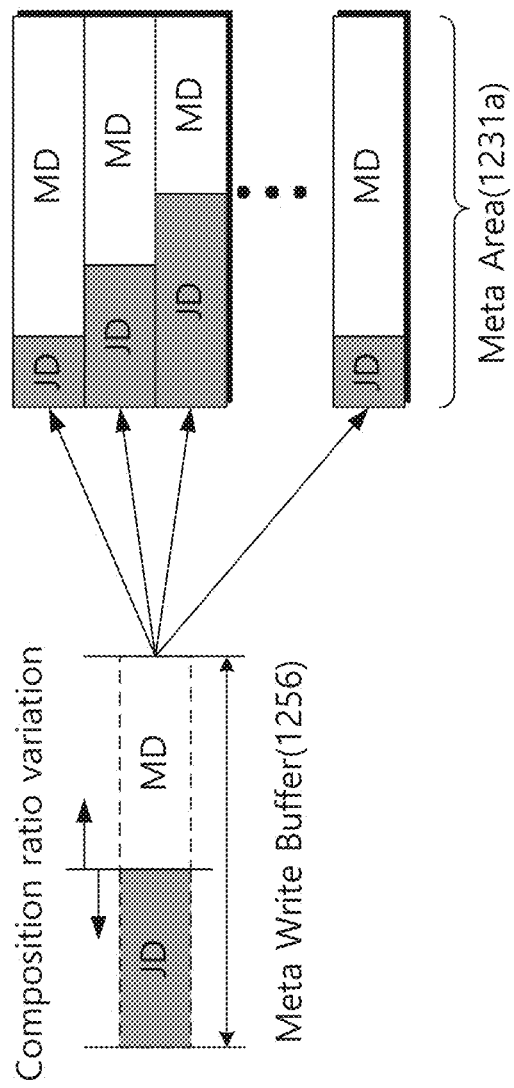
FIG. 4 is a diagram for explaining a method of adjusting a composition ratio of journal data and metadata in a meta write buffer according to one or more example embodiments of the disclosure.

FIG. 4 is a diagram for explaining a method of adjusting a composition ratio of journal data and metadata in a meta write buffer according to one or more example embodiments of the disclosure. Referring to FIG. 4, when it is determined that the journal buffer 1252 (see FIG. 2) configured to store journal data added (or updated) by the meta updater 1214 (see FIG. 2) is in the full state, the open time predictor 1216 may calculate the composition ratio of journal data and metadata according to the number of valid journals. Then, journal data JD and metadata MD may be programmed in the meta area 1231a of the non-volatile memory device 1230 according to the calculated composition ratio.

The open time predictor 1216 may calculate the composition ratio of journal data and metadata in a situation where the journal buffer 1252 is in a full state due to writing of journal data. The composition ratio may be determined by the number of valid journals among the journal data that actually affect the replay of metadata and thereby affect open time. For example, assuming that the number of valid journals that affect the open time is 3000, the composition ratio may be adjusted whenever the number of valid journals changes with respect to a standard value (or reference value) of 1000. For example, when the number of valid journals is less than 1000, the composition ratio of journal data and metadata may be set to 3:1.

On the other hand, when the number of valid journals is 2500, the composition ratio of journal data and metadata may be determined to be 1:3. However, it will be understood that conditions for setting the composition ratio of journal data and metadata in the meta write buffer 1256 may vary according to embodiments. The meta write data of the composed meta write buffer 1256 may be programmed into the meta area 1231a of the non-volatile memory device 1230 by the meta write logic 1218.

In the above-described manner, when the journal buffer 1252 is in a full state, the composition ratio of journal data and metadata may be determined based on the number of valid journals. Through this meta write procedure, the number of meta write operations may be reduced in situations where the number of valid journals is relatively small.

Figure 5:
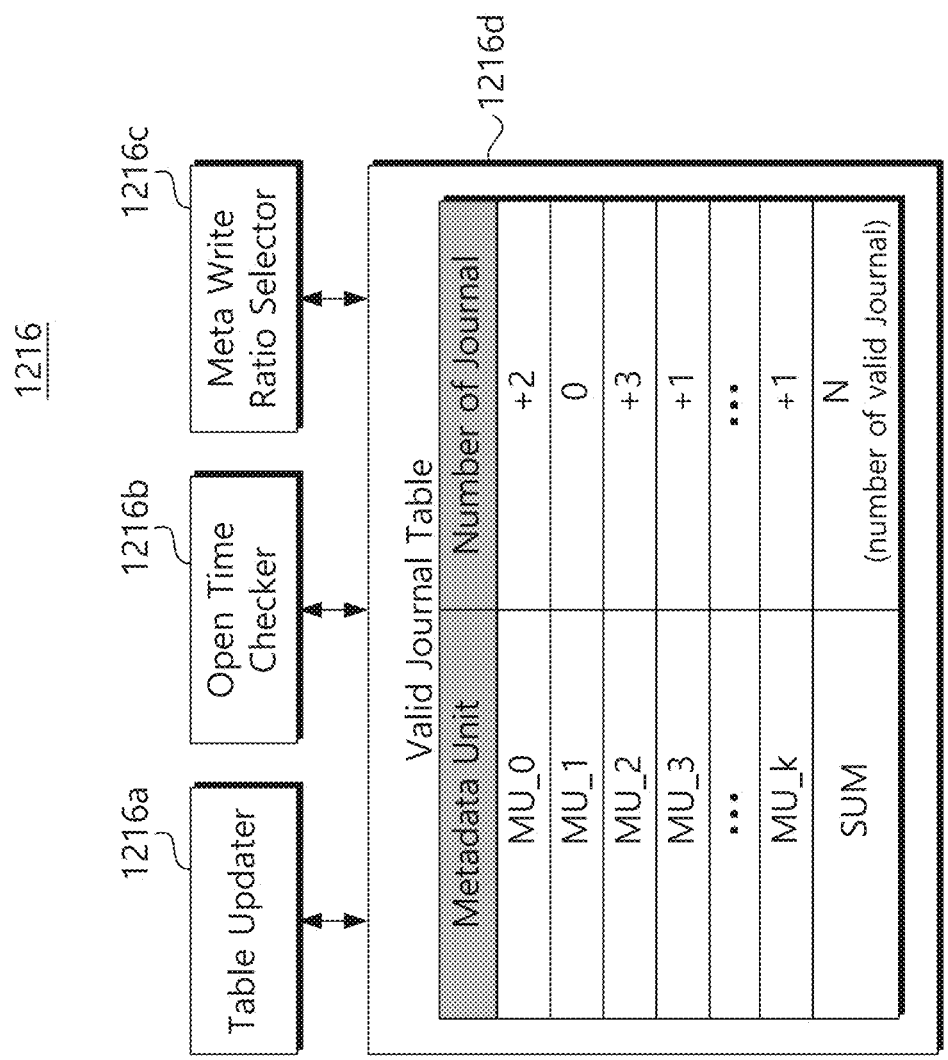
FIG. 5 is a block diagram showing an example of a configuration of an open time predictor according to one or more example embodiments of the disclosure.

FIG. 5 is a block diagram showing an example of a configuration of an open time predictor according to one or more example embodiments of the disclosure. Referring to FIG. 5, the open time predictor 1216 may include a table updater 1216a, an open time checker 1216b, a meta write ratio selector 1216c, and a valid journal table 1216d.

When journal data is added to the journal buffer 1252 by the meta updater 1214, the table updater 1216a may update a number of journals (e.g., number of valid journals) for each metadata unit. For example, when a journal entry for a metadata unit MU_0 is generated by the meta updater 1214, the number of journals (e.g., number of valid journals) for the metadata unit MU_0 may be updated by adding '1' to a previous number of journals thereof.

The open time checker 1216b may compare a sum of the number of valid journals of each of the updated metadata units in the valid journal table 1216d with a reference value. According to a comparison result, it may be determined whether the journals accumulated in the current journal buffer 1252 meet the open time. For example, assuming that the number of valid journals that meet the open time is 6000 or less, and that the composition ratio of the meta write buffer 1256 is variable based on units of 2000 valid journals, which is a reference value. Then, the sum of valid journals may be compared to the reference value of 2000. The ratio of metadata and journal data in the meta write buffer 1256 may vary according to the number of valid journals in comparison with units of 2000 valid journals. The comparison results of the open time checker 1216b may be provided to the meta write ratio selector 1216c.

The meta write ratio selector 1216c may determine the composition ratio of the meta write buffer 1256 according to a comparison result between the number of valid journals and the reference value by the open time checker 1216b. When the ratio of the meta write buffer 1256 is changed relative to units of a reference value of 2000 valid journals, that is if the number of valid journals is less than 2000, the ratio of journal data to metadata may be increased from a current ratio. For example, if the current composition ratio of journal data and metadata is 2:2, and the number of valid journals is determined as 1500, the meta write ratio selector 1216c may set the composition ratio of journal data and metadata to 3:1 (that is, increase the ratio of the journal data). On the other hand, if the number of valid journals is detected as 5000, the ratio of journal data may be changed from the current 2:2 to 1:3 (that is, decrease the ratio of the journal data). The data in the meta write buffer 1256 may be composed according to the composition ratio determined by the meta write ratio selector 1216c.

The valid journal table 1216d may manage the number of valid journals for each of the metadata units MU_0 to MU_k that are updated in the metadata buffer 1254. The number of valid journals may be updated according to the generation of journal entries for metadata units MU_0 to MU_k generated and updated in the metadata buffer 1254. The sum of the number of valid journals for each of the metadata units MU_0 to MU_k may be included in the valid journal table 1216d.

Figure 6:
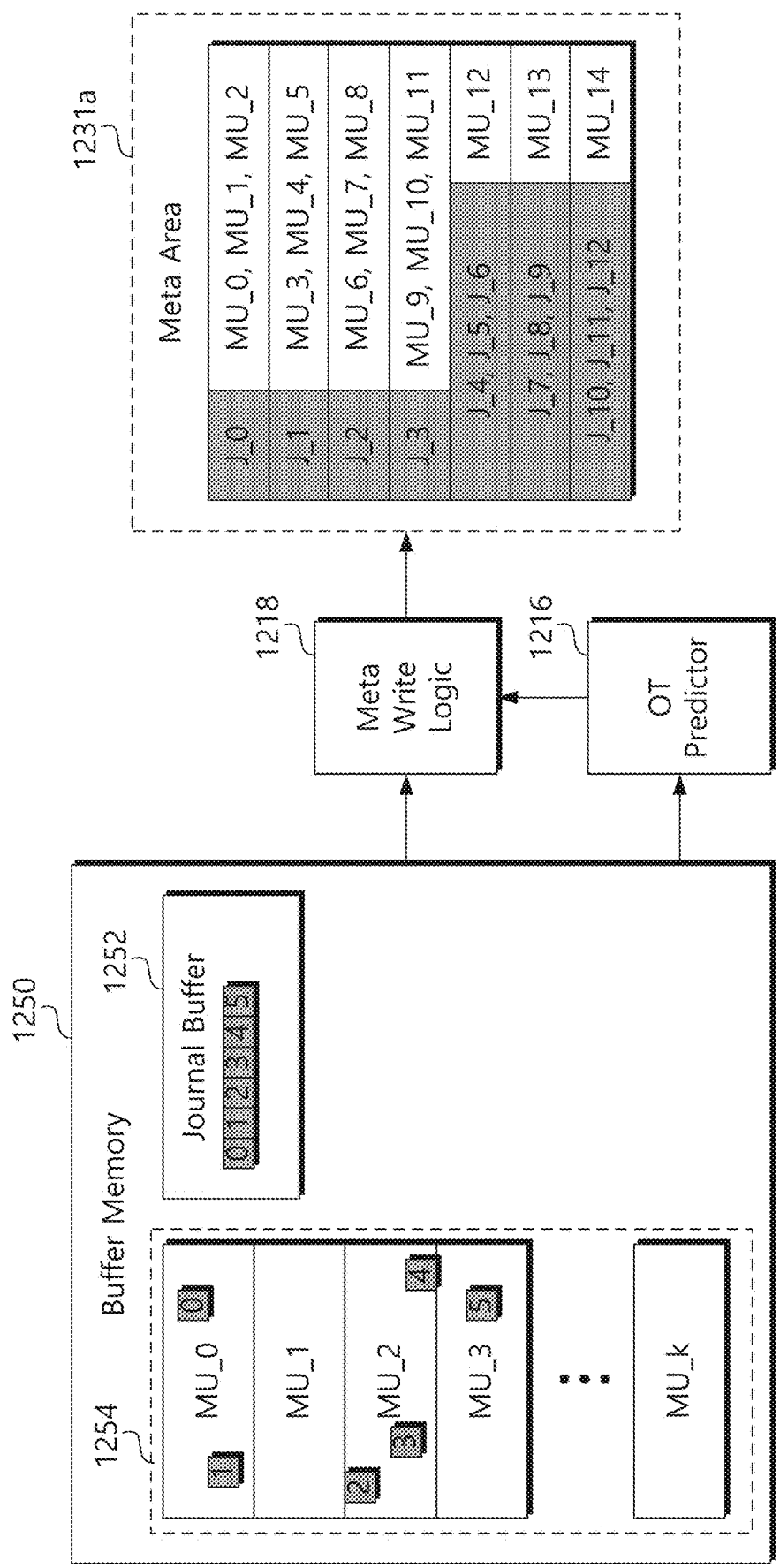
FIG. 6 is a diagram showing a dynamic journaling technique according to one or more example embodiments of the disclosure.

FIG. 6 is a diagram showing a dynamic journaling technique according to one or more example embodiments of the disclosure. Referring to FIG. 6, the composition ratio of journal data and metadata in the meta write buffer 1256 (see FIG. 2) may be dynamically adjusted according to the number of valid journals.

The meta updater 1214 may store the generated metadata in the metadata buffer 1254. For example, metadata may be stored in the metadata buffer 1254 per each of metadata units MU_0 to MU_k. When a change or an update occurs to any one of the metadata units MU_0 to MU_k of the metadata buffer 1254, journal data for a corresponding metadata unit MU_0 to MU_k may be generated. Journal data may be added to the journal buffer 1252.

Based on the full state of the journal buffer 1252, the open time predictor 1216 may select the composition ratio of the meta write buffer 1256 based on the number of valid journals. For example, it is assumed that the number of valid journals that may meet the open time is 6000 or less, and that the number of valid journals that is the reference value that is used in determining whether to change the composition ratio is 2000. When it is determined that the number of valid journals generated in the current journal buffer 1252 is 800 from the valid journal table 1216d, the open time predictor 1216 may update the composition ratio to 3:1 from the current composition ratio (e.g., journal data:metadata=3:1).

Figure 7:
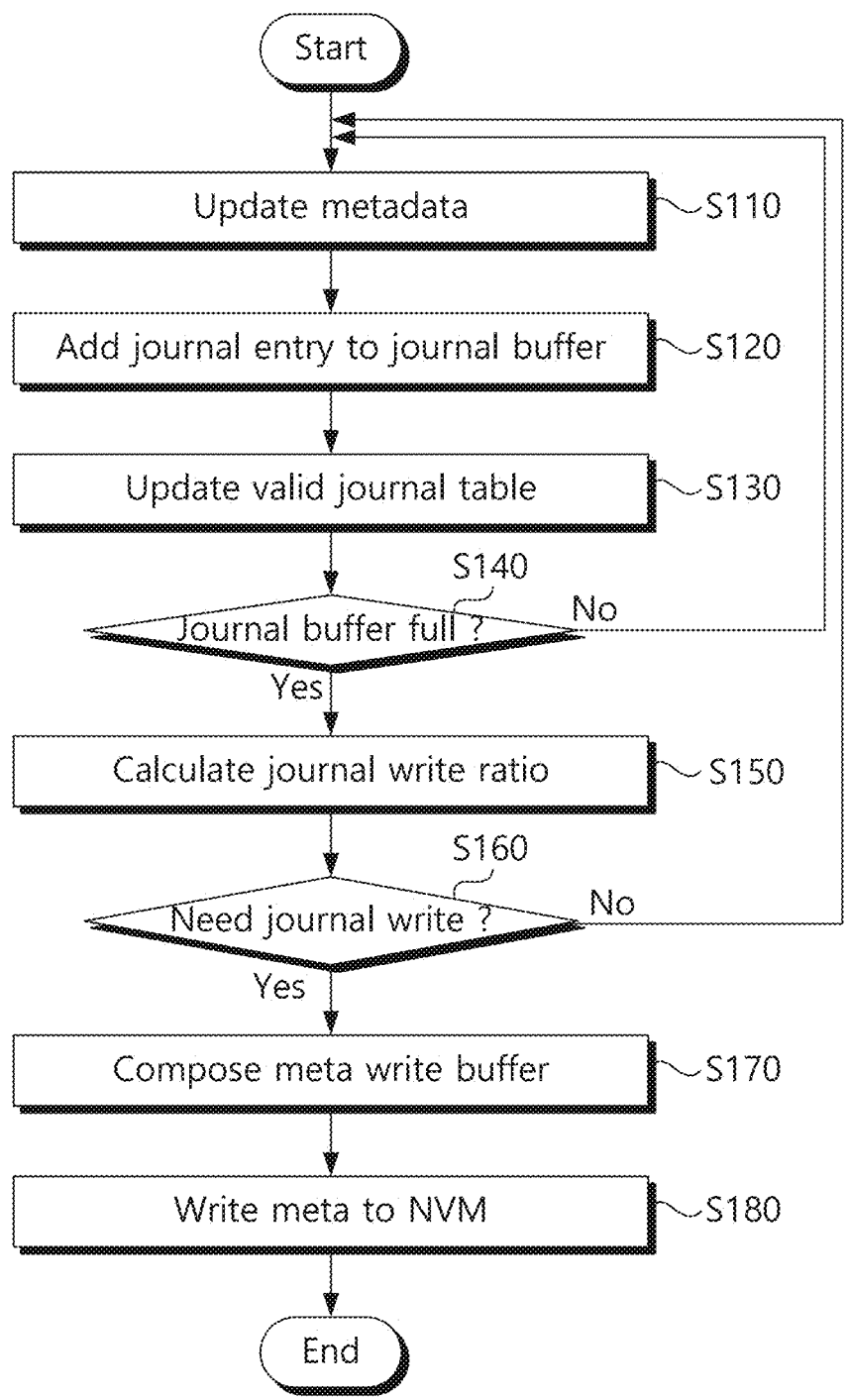
FIG. 7 is a flow chart showing a method of applying a dynamic journaling technique one or more example embodiments of the disclosure.

FIG. 7 is a flow chart showing a method of applying a dynamic journaling technique one or more example embodiments of the disclosure. Referring to FIG. 7, the storage device 1200 (see FIG. 2) may significantly reduce the number of metadata write operations by dynamically adjusting the composition ratio of metadata and journal data according to the number of valid journals.

In operation S110, the meta updater 1214 (see FIG. 2) of the storage controller 1210 (see FIG. 2) may generate metadata and updates the metadata in the metadata buffer 1254 (see FIG. 2). Metadata may be generated from address mapping of user data or various memory management operations for wear leveling.

In operation S120, the meta updater 1214 of the storage controller 1210 may generate journal data corresponding to the metadata stored in the metadata buffer 1254. The meta updater 1214 may write the generated journal data into the journal buffer 1252.

In operation S130, the meta updater 1214 may update the valid journal table 1216d for managing the number of valid journals among journal data generated according to metadata updates. The valid journal table 1216d may be used to monitor the number of valid journals in the open time predictor 1216.

In operation S140, it may be determined whether journal data of a size allocated to the journal buffer 1252 has been accumulated. If there is no more room to write journal data in the journal buffer 1252 (e.g., the journal buffer 1252 being in a full state), the meta write buffer 1256 needs to be composed with the journal data accumulated in the journal buffer 1252. If the journal buffer 1252 is determined to be full ('Yes' in S140), the procedure moves to operation S150. On the other hand, if it is determined that the journal buffer 1252 is not full ('No' in S140), the procedure may return to operation S110 and continue an accumulation process of metadata and journal data.

In operation S150, the open time predictor 1216 may determine the composition ratio of journal data and metadata of the meta write buffer 1256 based on the number of valid journals provided in the valid journal table 1216d. For example, if the number of valid journals of written metadata units is less than the reference value, the ratio of journal data in the meta write buffer 1256 may be increased.

In operation S160, the open time predictor 1216 may determine, based on the number of valid journals, whether to write journal data to the non-volatile memory device 1230 using the calculated composition ratio of journal data and metadata in the meta write buffer 1256. If it is determined that journal data and metadata need to be programmed in the meta area 1231a (e.g., the number of valid journals being high), the procedure moves to operation S170. On the other hand, if the number of valid journals is relatively small and it is possible to additionally accumulate journal data in the journal buffer 1252, the procedure may return to operation S110. In this case, since the journal buffer 1252 is determined as being in a full state in operation S140, new journal data may be accumulated by deleting old data (e.g., non-valid journals) in the journal buffer 1252. In an example, the new journal data may be accumulated by deleting old data that is stored in the journal buffer 1252 in a predetermined time period or greater.

In operation S170, the meta write logic 1218 may compose the meta write buffer 1256 according to the determined composition ratio of journal data and metadata. The meta write logic 1218 may combine the corresponding journal data and metadata from the journal buffer 1252 and the metadata buffer 1254, according to the determined composition ratio, to compose the meta write buffer 1256.

In operation S180, the meta write logic 1218 may program the meta write data composed in the meta write buffer 1256 into the meta area 1231a of the non-volatile memory device 1230. In an embodiment, based on the meta write data being written to the non-volatile memory device 1230 (or based on a determination to write the meta write data to the non-volatile memory device 1230), the number of valid journals in the valid journal table 1216d may be initialized. In an embodiment, the table updater 1216a may initialize the valid journal table 1216d including the number of valid journals after the meta write buffer is composed.

In the above, the meta management method according to the dynamic journaling technique performed in the storage device 1200 in one or more example embodiments of the disclosure has been described. By applying the dynamic journaling technique described above, a ratio of metadata in the meta write buffer may be varied based on the number of valid journals, and the number of metadata write operations may be significantly reduced. Thus, the performance of the storage device 1200 may be improved. Additionally, the lifespan of the non-volatile memory device 1230 may be extended by reducing the number of metadata write operations.

Figure 8:
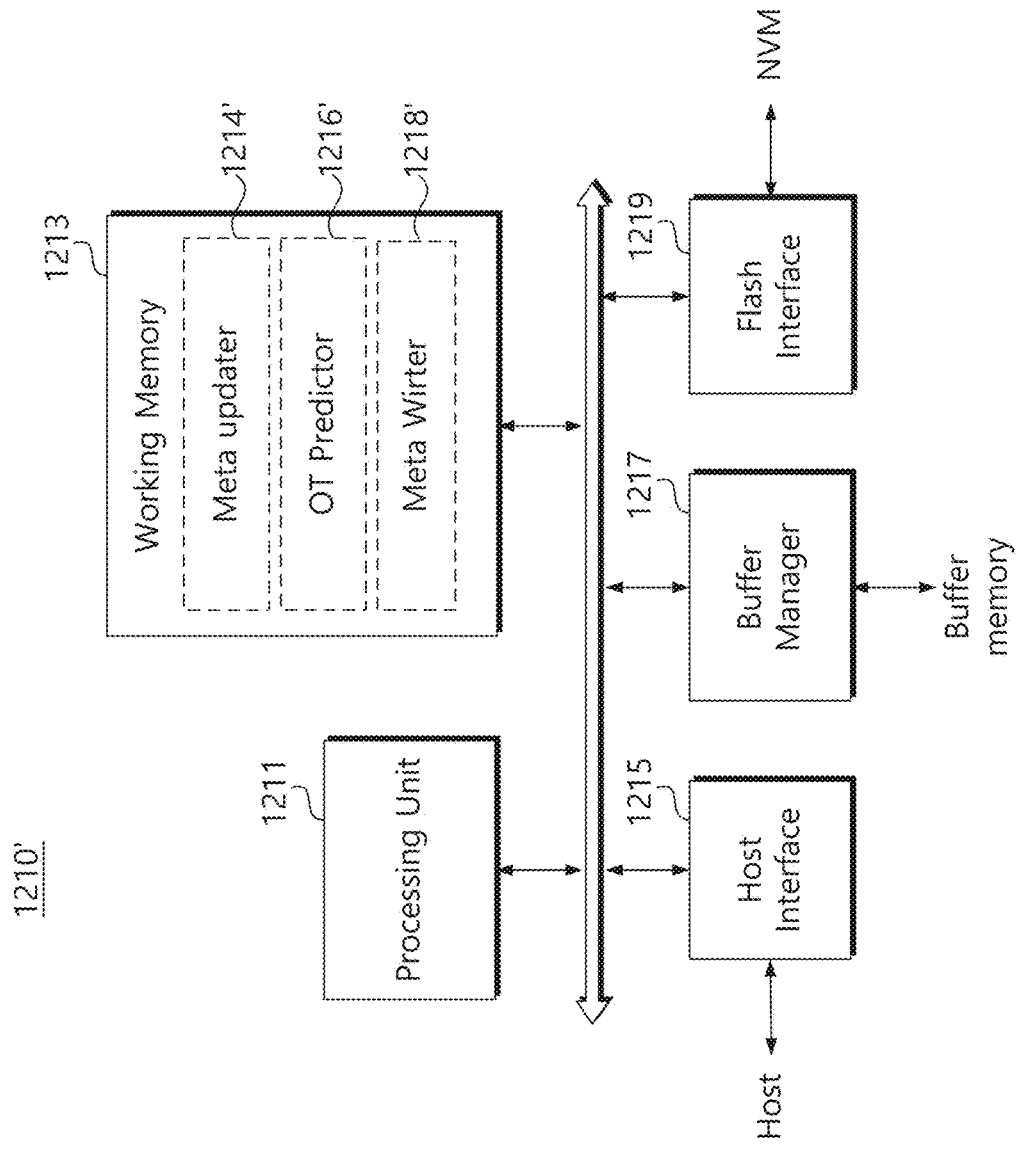
FIG. 8 is a block diagram showing another example of a configuration of a storage controller shown in FIG. 2.

FIG. 8 is a block diagram showing another example of a configuration of the storage controller shown in FIG. 2. Referring to FIG. 8, a storage controller 1210' may include a processing unit 1211, a working memory 1213, a host interface 1215, a buffer manager 1217, and a flash interface 1219. However, it will be understood that the components of the storage controller 1210' are not limited to the components mentioned above. For example, the storage controller 1210 may further include additional components such as a read only memory (ROM) that stores code data required for a booting operation or an error correction code (ECC) block.

The processing unit 1211 may include a central processing unit or a microprocessor. The processing unit 1211 may run software or firmware for driving the storage controller 1210'. In particular, the processing unit 1211 may drive software modules loaded into the working memory 1213. In addition, the processing unit 1211 may execute core functions of the storage device 1200, such as a flash translation layer (FTL). Additionally, the processing unit 1211 may be provided in a multi-core form consisting of a plurality of CPUs.

Software modules or data for controlling the storage controller 1210 may be loaded into the working memory 1213. Software and data loaded into the working memory 1213 may be driven or processed by the processing unit 1211. In particular, according to one or more example embodiments of the disclosure, the working memory 1213 may include a meta updater module 1214' an open time predictor module 1216', and a meta writer modules 1218', and may perform the function of the dynamic meta manager 1212 (see FIG. 1). The working memory 1213 may be implemented with, for example, a static random access memory (SRAM).

The meta updater module 1214' driven by the processing unit 1211 may manage metadata MD and/or journal data JD. The meta updater module 1214' may accumulate metadata MD in the metadata buffer 1254 and journal data JD in the journal buffer 1252 configured in the buffer memory 1250. Additionally, the meta updater module 1214' may perform initialization based on metadata MD read from the non-volatile memory device 1230 when the storage device 1200 is reset or powered on. In particular, the meta updater 1214 may perform a replay to update metadata using journal data read from the non-volatile memory device 1230.

The open time predictor module 1216' driven by the processing unit 1211 may manage the amount of valid journals for each metadata unit updated by the meta updater module 1214' using a valid journal table. When the journal buffer 1252 is full, the open time predictor module 1216' may determine the data composition ratio of the meta write buffer 1256 based on the number of valid journals corresponding to each metadata unit. The open time predictor module 1216' may adjust the composition ratio of journal data and metadata in the meta write buffer 1256 based on the amount of valid journal data, which affects the open time of the storage device 1200, through the valid journal table.

The meta writer module 1218' may configure the meta write buffer 1256 according to the composition ratio of journal data and metadata determined by the open time predictor module 1216'. The meta writer module 1218' may program the metadata and journal data composed in the meta write buffer 1256 into the meta area 1231*a* of the non-volatile memory device 1230.

The host interface 1215 may provide an interface between the host 1100 and the storage controller 1210'. The host and the storage controller 1210' may be connected through one of various standard interfaces. Here, the standard interfaces include at least one of ATA (Advanced Technology Attachment), SATA (Serial ATA), e-SATA (external SATA), SCSI (Small Computer Small Interface), SAS (Serial Attached SCSI), PCI (Peripheral component Interconnection), and PCIe (PCI Express), USB (Universal Serial Bus), IEEE 1394, UFS (Universal Flash Storage), eMMC (Embedded Multi Media Card), NVMe, NVMe-of, NVMe-MI, etc.

The buffer manager 1217 may provide a buffer function for read or write data moving between the host interface 1215 and the flash interface 1219. The buffer manager 1217 controls the buffer memory 1250 implemented with high-capacity dynamic random access memory DRAM and may provide a DMA function or a buffer function between the non-volatile memory device 1230 and the host 1100.

The flash interface 1219 may provide an interface between storage controller 1210' and non-volatile memory device 1230. For example, data processed by the processing unit 1211 is stored in the non-volatile memory device 1230 through the flash interface 1219. As another example, data stored in the non-volatile memory device 1230 may be exchanged with the storage controller 1210' through the flash interface 1219.

Configurations of the storage controller 1210' described above by way of example have been described. According to the function of the storage controller 1210' of the disclosure, the meta updater module 1214', the open time predictor module 1216', and the meta writer module 1218' may be provided as software modules. These components may perform the function of the dynamic meta manager 1212 of FIG. 2. By operating the dynamic meta manager 1212, the storage device 1200 of the disclosure may manage metadata according to the dynamic journaling technique. Thus, the data ratio of the meta write buffer may be varied based on the number of valid journals, and the number of times metadata writing may be substantially reduced. Additionally, the lifespan of the non-volatile memory device 1230 may be extended by reducing the number of metadata write operations.

Figure 9:
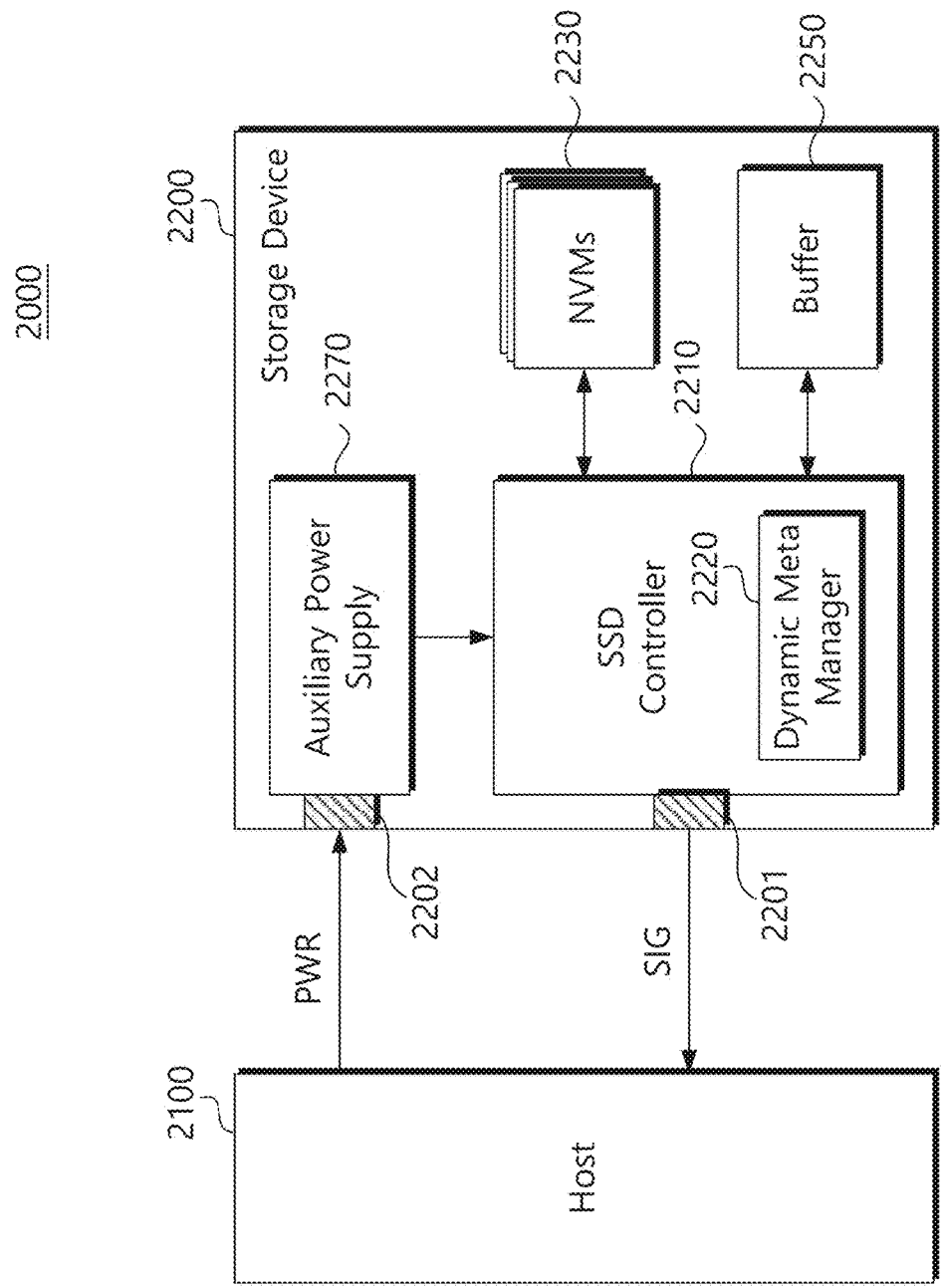
FIG. 9 is a block diagram showing a storage system according to one or more example embodiments of the disclosure.

FIG. 9 is a block diagram showing a storage system according to one or more example embodiments of the disclosure. Referring to FIG. 9, the storage system 2000 may include a host 2100 and a storage device 2200 implemented as a solid state drive. In an example embodiment, the host 2100 and the storage device 2200 may respectively correspond to the host 1100 and the storage device 1200 described with reference to FIGS. 1 to 8. Alternatively, the host 2100 and the storage device 2200 may operate based on the operation method described with reference to FIGS. 1 to 8.

The storage device 2200 may exchange a signal SIG with the host 2100 through a signal connector 2201 and receive power PWR through a power connector 2202. The storage device 2200 may include an SSD controller 2210, a plurality of non-volatile memories 2230, a buffer memory 2250, and an auxiliary power supply 2270.

The SSD controller 2210 may control a plurality of non-volatile memories 2230 in response to the signal SIG received from the host 2100. The plurality of non-volatile memories 2230 may operate under the control of the SSD controller 2210. The auxiliary power device 2270 may be connected to the host 2100 through the power connector 2202. The auxiliary power supply device 2270 may receive power PWR from the host 2100 and be charged. The auxiliary power device 2270 may provide power to the storage device 2200 when power supply from the host 2100 is not smooth. The buffer memory 2250 may be used as a buffer memory of the storage device 2200.

In an example embodiment, the storage device 2200 may use a dynamic journaling technique that varies the write ratio of metadata and journal data through a dynamic meta manager 2220. As the dynamic meta manager 2220 operates, the storage device 2200 of the disclosure may manage metadata according to the dynamic journaling technique. Therefore, the data ratio of the meta write buffer may be varied depending on the number of valid journals, and the number of times metadata is written may be substantially reduced. Additionally, the lifespan of the non-volatile memory device 2230 may be extended by reducing the number of metadata write operations.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

It should be understood that example embodiments described herein should be considered in a descriptive sense only and not for purposes of limitation. Descriptions of features or aspects within each embodiment should typically be considered as available for other similar features or aspects in other embodiments. While one or more example embodiments have been described with reference to the figures, it will be understood by those of ordinary skill in the art that various changes in form and details may be made therein without departing from the spirit and scope as defined by the following claims and their equivalents.

What is claimed is:

1. A method of operating a storage device, the method comprising:
    updating metadata to a metadata buffer;
    writing journal data corresponding to the metadata into a journal buffer;
    determining a composition ratio between the journal data and the metadata, based on a number of valid journals involved in a replay of the metadata among the journal data;
    composing a meta write data in a meta write buffer, the meta write data comprising the metadata from the metadata buffer and the journal data from the journal buffer according to the determined composition ratio; and
    programming the meta write data composed in the meta write buffer into a non-volatile memory device.

2. The method of claim 1, further comprising:
    configuring a valid journal table that includes the number of valid journals corresponding to each unit of the metadata.

3. The method of claim 2, further comprising:
    increasing a ratio of the journal data, in the composition ratio, based on the number of valid journals included in the valid journal table being less than a reference value.

4. The method of claim 1, wherein the determining the composition ratio comprises determining the composition ratio based on a determination that the journal buffer is in a full state.

5. The method of claim 4, further comprising, prior to the composing the meta write data:
    determining, based on the number of valid journals, whether to write the meta write data stored in the meta write buffer to the non-volatile memory device.

6. The method of claim 5, wherein, based on a determination to write the meta write data to the non-volatile memory device, the number of valid journals is initialized.

7. The method of claim 6, wherein the programming the meta write data comprises programming the meta write data in a meta area of the non-volatile memory device.

8. The method of claim 1, wherein the determining the composition ratio comprises adjusting the composition ratio in a range that meets an open time allowed in the storage device.

9. A storage device, comprising:
    a non-volatile memory device including a meta area and a user area;
    a buffer memory comprising a metadata buffer in which metadata is updated, a journal buffer in which journal data is stored, and a meta write buffer in which meta write data to be programmed in the meta area is composed; and
    a storage controller configured to update the metadata in the metadata buffer and the journal data in the journal buffer, and based on the journal buffer being in a full state, determine a composition ratio between the journal data and the metadata in the meta write buffer based on a number of valid journals involved in a replay of the metadata among the journal data.

10. The storage device of claim 9, wherein the storage controller is further configured to compose the meta write buffer by adjusting the composition ratio to increase or decrease a ratio of the journal data in the meta write buffer based on the number of valid journals.

11. The storage device of claim 10, wherein the storage controller is further configured to:
    monitor the journal data updated in the journal buffer, manage the number of valid journals, and determine the composition ratio based on the number of valid journals.

12. The storage device of claim 11, wherein the storage controller includes a valid journal table to manage the number of valid journals in units of the metadata.

13. The storage device of claim 12, wherein the storage controller is further configured to, in managing the number of valid journals:
    monitor the number of valid journals among the journal data and record the number in the valid journal table; and
    determine the composition ratio of the meta write buffer based on a comparison between the number of valid journals and a reference value.

14. The storage device of claim 13, wherein the storage controller is further configured to initialize the valid journal table after the meta write buffer is composed.

15. The storage device of claim 14, wherein the storage controller is further configured to adjust the composition ratio of the meta write buffer in a range that meets an open time allowed in the storage device.

16. A method of operating a storage device that manages metadata according to a journaling technique, the method comprising:
    writing journal data into a journal buffer;
    determining a number of valid journals involved in a replay of metadata among the journal data written in the journal buffer; and
    determining a composition ratio of a meta write buffer according to the determined number of valid journals.

17. The method of claim 16, further comprising:
    composing the meta write buffer including the metadata and the journal data according to the composition ratio.

18. The method of claim 17, further comprising:
    programming meta write data of the composed meta write buffer into a meta area of a non-volatile memory device.

19. The method of claim 16, further comprising:
    configuring a valid journal table for monitoring the number of valid journals.

20. The method of claim 19, wherein the determining the composition ratio comprises adjusting the composition ratio in a range that meets an open time allowed in the storage device.

* * * * *